US011607982B2

(12) United States Patent
Tian et al.

(10) Patent No.: US 11,607,982 B2
(45) Date of Patent: Mar. 21, 2023

(54) TRANSPORT VEHICLE AND INSTALLATION METHOD FOR CASE OF MOBILE POWER GENERATION SYSTEM

(71) Applicant: YANTAI JEREH PETROLEUM EQUIPMENT & TECHNOLOGIES CO., LTD., Shandong (CN)

(72) Inventors: Dekun Tian, Shandong (CN); Tao Kou, Shandong (CN); Libin Zhou, Shandong (CN); Ning Feng, Shandong (CN); Haibo Zhang, Shandong (CN); Honly Wang, Shandong (CN); Yichao Mou, Shandong (CN); Xin Li, Shandong (CN); Xu Liu, Shandong (CN); Lili Wang, Shandong (CN); Yannan Liu, Shandong (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 127 days.

(21) Appl. No.: 17/204,620

(22) Filed: Mar. 17, 2021

(65) Prior Publication Data
US 2022/0242297 A1 Aug. 4, 2022

(30) Foreign Application Priority Data

Feb. 1, 2021 (CN) .......................... 202110137704.3

(51) Int. Cl.
B60P 1/16 (2006.01)
B65G 67/04 (2006.01)
(Continued)

(52) U.S. Cl.
CPC ................... B60P 1/16 (2013.01); B60P 1/32 (2013.01); B60P 1/34 (2013.01); B60P 1/6427 (2013.01); B60P 1/6436 (2013.01); B65G 67/04 (2013.01)

(58) Field of Classification Search
CPC .... B60P 1/16; B60P 1/28; B60P 1/283; B60P 1/30; B60P 1/32; B60P 1/34;
(Continued)

(56) References Cited

U.S. PATENT DOCUMENTS 3,355,043 A * 11/1967 Talbert ............... B62D 53/0821
414/919
6,765,304 B2 7/2004 Baten et al.
(Continued)

FOREIGN PATENT DOCUMENTS

CN 106429119 A 2/2017
CN 110848028 A 2/2020
WO WO-2020258004 A1 * 12/2020 ................ F02C 6/00

Primary Examiner — James Keenan
(74) Attorney, Agent, or Firm — Xsensus LLP

(57) ABSTRACT

Embodiments of the present disclosure provide a transport vehicle and an installation method for a case of a mobile power generation system. The transport vehicle includes: a chassis and a lifting mechanism assembly located on the chassis. The lifting mechanism assembly includes: a turning frame hinged to the chassis at a hinged position of the chassis, at least one turning hydraulic cylinder connected to the turning frame and the chassis, and a connecting frame configured to be detachably connected to the case. In the main beam, the first body portion is located between the hinged position and the second body portion, and a third plane in which a surface of the second body portion facing towards the turning frame is located is farther away from the connecting frame than the first plane.

20 Claims, 6 Drawing Sheets

(51) Int. Cl.
*B60P 1/64* (2006.01)
*B60P 1/34* (2006.01)
*B60P 1/32* (2006.01)

(58) Field of Classification Search
CPC ...... B60P 1/6427; B60P 1/6436; B65G 67/04; Y10S 414/132
USPC .................................................. 414/346, 919
See application file for complete search history.

(56) References Cited

U.S. PATENT DOCUMENTS

| | | | |
|---|---|---|---|
| 7,357,616 B2* | 4/2008 | Andrews | E21B 7/02 414/919 |
| 9,534,473 B2 | 1/2017 | Morris et al. | |
| 9,925,904 B2* | 3/2018 | Pham | B60P 1/32 |
| 11,143,000 B2* | 10/2021 | Li | H02K 7/1823 |
| 2016/0362035 A1* | 12/2016 | Cain | B65G 67/04 |
| 2020/0276926 A1* | 9/2020 | Dewan | B65G 61/00 |

* cited by examiner

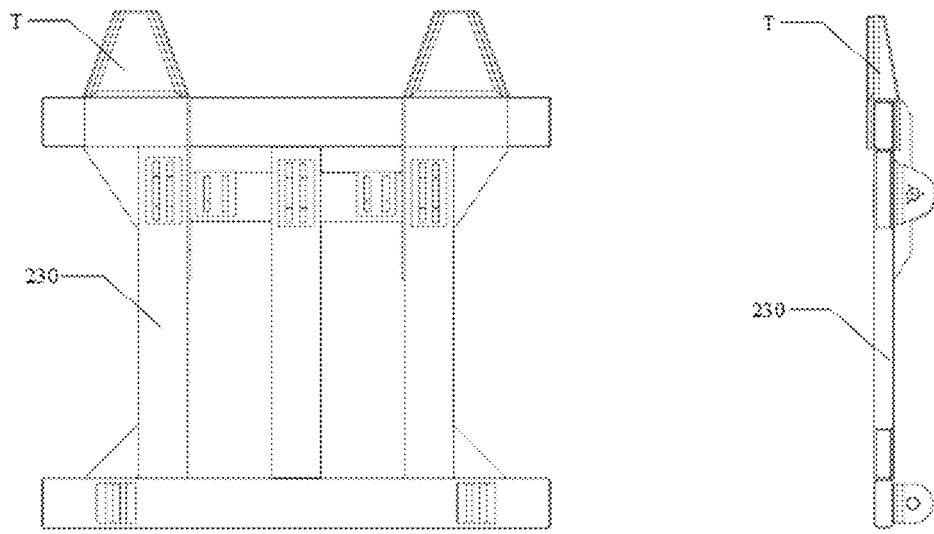

FIG. 5A  FIG. 5B connecting the case with the connecting frame of the transport vehicle under a circumstance of driving the turning frame to rotate so that the first included angle has a first angle value, driving the connecting frame to move away from the turning frame in the second direction so that the turning frame and the connecting frame are spaced from each other in the second direction, wherein the first angle value is An acute angle value under a circumstance of driving the turning frame to rotate so that the first included angle has a second angle value, driving the push-lifting frame assembly to move in the first direction, wherein the second angle value is greater than the first angle value

FIG. 6

TRANSPORT VEHICLE AND INSTALLATION METHOD FOR CASE OF MOBILE POWER GENERATION SYSTEM

CROSS-REFERENCE TO RELATED APPLICATION

For all purposes under the U.S. law, the present application claims priority of the Chinese Patent Application No. 202110137704.3, filed on Feb. 1, 2021, the disclosure of which is incorporated herein by reference in its entirety as part of the present application.

TECHNICAL FIELD

Embodiments of the present disclosure relates to a transport vehicle and an installation method for a case of a mobile power generation system.

BACKGROUND

At present, the exhaust of vehicle-mounted gas turbine generator sets is mostly designed to be provided on top, and the exhaust muffler needs to be transported to the site by a transport vehicle. During the installation, the exhaust muffler needs to be connected to a sling, and a crane is used to hoist the exhaust muffler to the installation location for installation and fixation. This method requires several people to cooperate, and the crane needs to be prepared in advance. When the exhaust muffler is hoisted, an operator must climb onto the installation position for command. The exhaust muffler is hoisted by flexible steel cables and needs to be drawn by rope. After the hoisting is completed, the operator must climb onto the top of the exhaust muffler to work high above the ground and remove a hoisting lock. When removing the exhaust muffler, the operator needs to climb onto the roof of the vehicle about 4 to 6 meters high and install the hoisting lock, and the crane is used to hoist and remove the exhaust muffler.

There are many disadvantages in use of the crane for removing the exhaust muffler on top of the gas turbine generator set. For example, this method requires several people to cooperate, and the crane needs to be prepared in advance; the operator must climb onto the installation position for command while the exhaust muffler is hoisted; moreover, the exhaust muffler is hoisted by flexible steel cables, which is difficult to control and install, and needs long installation time. After the hoisting is completed, the operator must climb onto the top of the exhaust muffler to work high above the ground and remove the hoisting lock, which poses a safety risk for the operator.

SUMMARY

An embodiment of the present disclosure provides a transport vehicle for a case of a mobile power generation system, including: a chassis and a lifting mechanism assembly located on the chassis. The chassis includes a main beam. The main beam includes a first body portion. The lifting mechanism assembly includes: a turning frame, hinged to the chassis at a hinged position of the chassis, wherein the turning frame includes a positioning end configured to be connected to the chassis and a free end opposite to the positioning end; at least one turning hydraulic cylinder, connected to the turning frame and the chassis, and configured to drive the turning frame to rotate relative to the chassis to change an angle value of a first included angle between a first plane in which a surface of the first body portion facing towards the turning frame is located and a second plane in which a surface of the turning frame facing away from the first body portion is located; and a connecting frame, configured to be detachably connected to the case, wherein the connecting frame is movably connected to the turning frame in a first direction and a second direction, and the first direction is a direction from the positioning end to the free end, the second direction is perpendicular to the second plane, and the first direction intersects the second direction. The main beam further includes a second body portion, the first body portion is located between the hinged position and the second body portion, and a third plane in which a surface of the second body portion facing towards the turning frame is located is farther away from the connecting frame than the first plane; under a circumstance that the angle value of the first included angle is smallest, a part of the lifting mechanism assembly is located between the first plane and the third plane.

In an example, the lifting mechanism assembly further includes: a push-lifting frame assembly, movably connected to the turning frame; at least one elevating hydraulic cylinder, connected to the push-lifting frame assembly and the turning frame and configured to drive the push-lifting frame assembly to move relative to the turning frame in the first direction; and at least one push-lifting hydraulic cylinder, connected to the push-lifting frame assembly and the connecting frame and configured to drive the connecting frame to move relative to the push-lifting frame assembly in the second direction.

In an example, the push-lifting frame assembly includes: an elevating frame, movably connected to the turning frame, wherein the push-lifting frame assembly and the turning frame are connected with each other through the elevating frame, the at least one elevating hydraulic cylinder is connected to the elevating frame and the turning frame and is configured to drive the elevating frame to move relative to the turning frame in the first direction; and a sliding frame, movably connected to the elevating frame, wherein the push-lifting frame assembly and the connecting frame are connected with each other through the sliding frame, and the at least one push-lifting hydraulic cylinder is connected to the sliding frame and the connecting frame and is configured to drive the connecting frame to move relative to the sliding frame in the second direction, wherein the lifting mechanism assembly further includes: at least one sliding hydraulic cylinder connected to the sliding frame and the elevating frame and configured to drive the sliding frame to move relative to the elevating frame in a third direction, wherein the third direction is perpendicular to the first direction and the second direction.

In an example, at least one sliding beam is fixedly connected to the elevating frame, the at least one sliding beam extends in the third direction, and the sliding frame is sleeved on the at least one sliding beam and is configured to move relative to the at least one sliding beam in the third direction.

In an example, the sliding frame is movably connected to the connecting frame through at least one hinged arm, and the at least one hinged arm is hinged to the connecting frame through a first rotating shaft, the at least one push-lifting hydraulic cylinder is hinged with the connecting frame through a second rotating shaft, and the first rotating shaft and the second rotating shaft both extend in the third direction and are arranged coaxially.

In an example, the at least one sliding hydraulic cylinder includes a first sliding hydraulic cylinder and a second sliding hydraulic cylinder, the at least one push-lifting hydraulic cylinder is located between the first sliding hydraulic cylinder and the second sliding hydraulic cylinder in the first direction.

In an example, the first sliding hydraulic cylinder is located between the sliding frame and the elevating frame in the first direction; the second sliding hydraulic cylinder is located between the sliding frame and the connecting frame in the second direction.

In an example, a mounting support is fixedly connected to the sliding frame, a support end of the mounting support is closer to the second body portion of the chassis in the second direction than the sliding frame, the at least one push-lifting hydraulic cylinder is hinged to the support end and is closer to the second body portion of the chassis in the second direction than the sliding frame.

In an example, a part of the at least one turning hydraulic cylinder is located on a side of the third plane opposite to the first plane.

In an example, the chassis further includes a box beam fixedly connected to the second body portion of the main beam, the box beam is arranged as intersecting the second body portion of the main beam, and the at least one turning hydraulic cylinder and the chassis are connected with each other through the box beam.

In an example, the transport vehicle further includes: a limiting frame, wherein the limiting frame includes a first sub-limiting frame and a second sub-limiting frame hinged to each other, the first sub-limiting frame is hinged onto the turning frame, the second sub-limiting frame is hinged onto the first body portion of the chassis.

In an example, under a circumstance that the first included angle is largest, a second included angle between a surface of the second sub-limiting frame facing towards the first body portion and a surface of the first body portion facing towards the second sub-limiting frame is greater than or equal to 45°.

In an example, the transport vehicle further includes: a hydraulic pipeline arranged on the limiting frame.

In an example, the at least one turning hydraulic cylinder has a first end and a second end opposite to the first end, the first end and the second end are movable relative to each other, the first end is hinged to the turning frame, the second end is hinged to the chassis, and all opening(s) of the at least one turning hydraulic cylinder in liquid communication with outside is/are only located on the second end.

In an example, the at least one push-lifting hydraulic cylinder has a third end and a fourth end opposite to the third end, the third end and the fourth end are movable relative to each other, the third end is hinged to the push-lifting frame assembly, the fourth end is hinged to the connecting frame, and all opening(s) of the at least one push-lifting hydraulic cylinder in liquid communication with outside is/are only located on the third end.

In an example, at least one connecting end is provided on a side of the connecting frame facing away from the hinge position, the at least one connecting end has a trapezoidal platform shape.

In an example, the case is an exhaust muffler for a gas turbine generator set.

Another embodiment of the present disclosure provides an installation method for a case of a mobile power generation system, including:

connecting the case with the connecting frame of any one of the transport vehicles described above;

under a circumstance of driving the turning frame to rotate so that the first included angle has a first angle value, driving the connecting frame to move away from the turning frame in the second direction so that the turning frame and the connecting frame are spaced from each other in the second direction, wherein the first angle value is an acute angle value; and under a circumstance of driving the turning frame to rotate so that the first included angle has a second angle value, driving the push-lifting frame assembly to move in the first direction, wherein the second angle value is greater than the first angle value.

In an example, the first angle value is greater than or equal to 20° and less than or equal to 60°.

BRIEF DESCRIPTION OF THE DRAWINGS

In order to clearly illustrate the technical solutions of the embodiments of the present disclosure or a prior art, the drawings necessarily for explaining the embodiments or the prior art will be briefly described in the following; it is obvious that the described drawings below are only related to some embodiments of the present disclosure, from which other embodiments may also be derived without any creative labor for those skilled in the art.

FIG. 5A schematically shows a structural front view of a connecting frame of a transport vehicle for a case of a mobile power generation system provided by an embodiment of the present disclosure;

FIG. 5B schematically shows a structural side view of a connecting frame of a transport vehicle for a case of a mobile power generation system provided by an embodiment of the present disclosure;

FIG. 6 schematically shows a flowchart of an installation method for a case of a mobile power generation system according to another embodiment of the present disclosure;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical or scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Embodiments of the present disclosure provide a transport vehicle and an installation method for a case of a mobile power generation system.

Figure 1A:
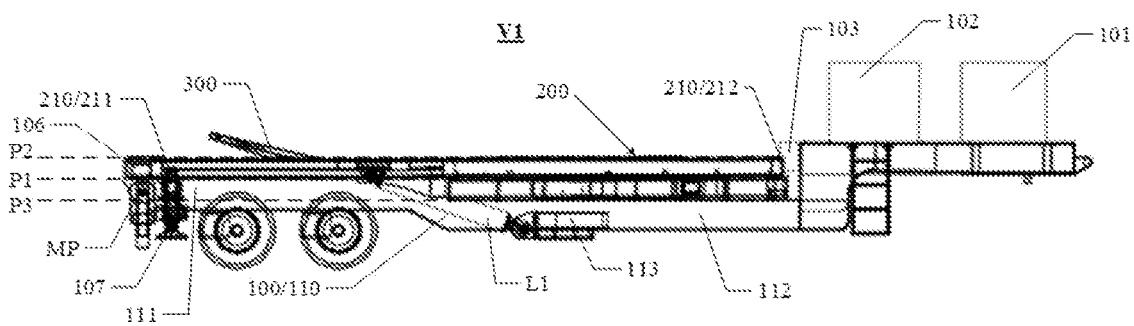
FIG. 1A schematically shows a structural side view of a transport vehicle for a case of a mobile power generation system provided by an embodiment of the present disclosure, in which a lifting mechanism assembly is in a fully retracted state.
Figure 1B:
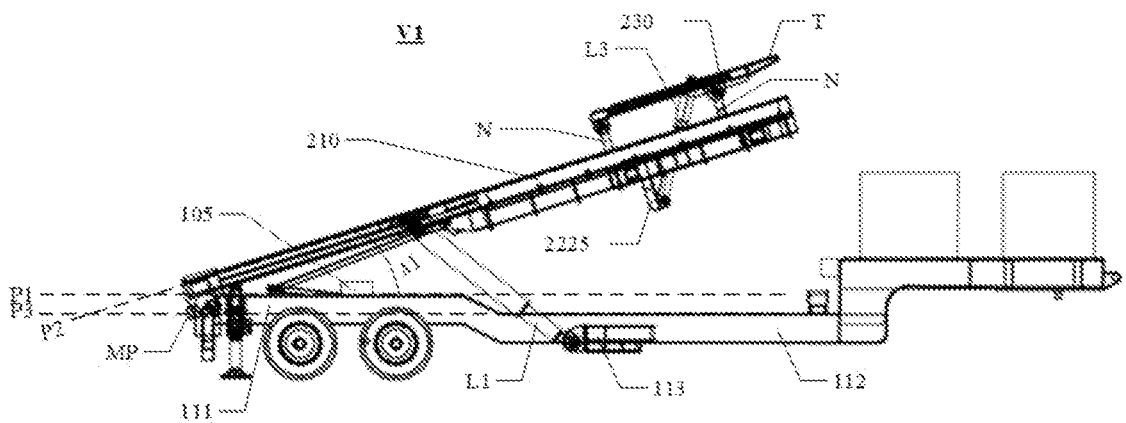
FIG. 1B schematically shows a structural side view of a transport vehicle for a case of a mobile power generation system provided by an embodiment of the present disclosure, in which a lifting mechanism assembly is in a first open state where a first included angle is an acute angle.
Figure 2:
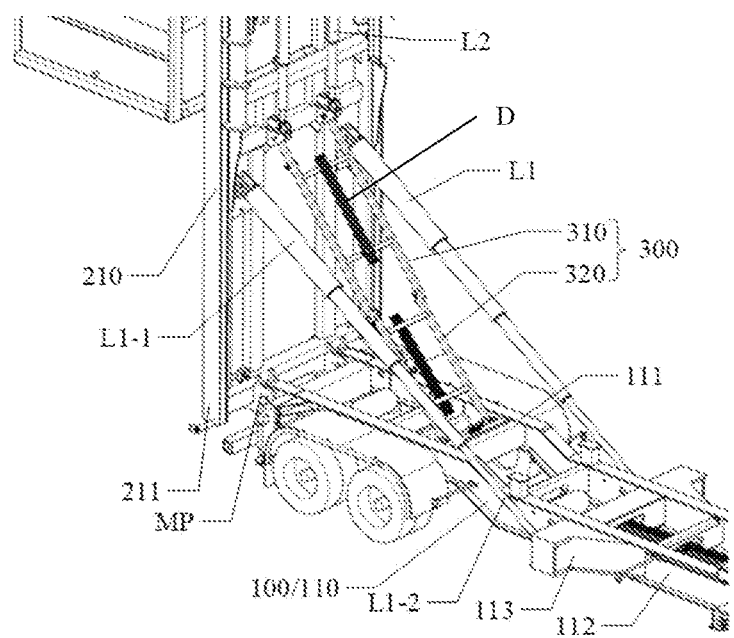
FIG. 2 schematically shows a partial three-dimensional structural diagram of a transport vehicle for a case of a mobile power generation system provided by an embodiment of the present disclosure, in which a lifting mechanism assembly is in a second open state where a first angle is a right angle.
Figure 3:
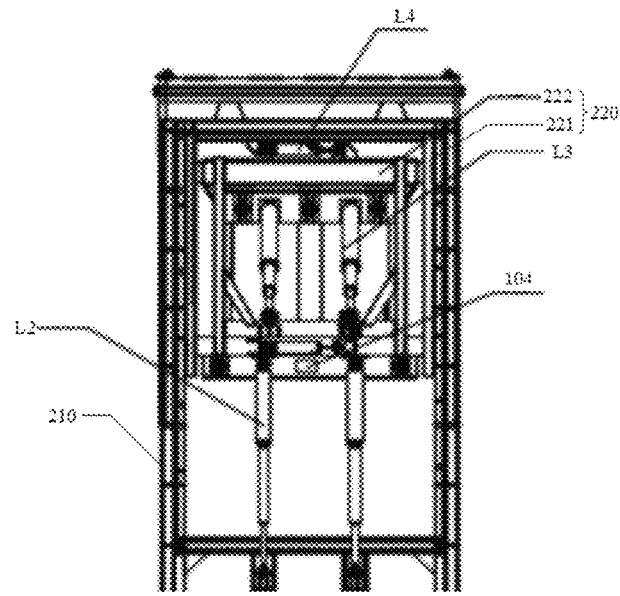
FIG. 3 schematically shows a partial structural side view of a lifting mechanism assembly of a transport vehicle for a case of a mobile power generation system provided by an embodiment of the present disclosure.
Figure 4A:
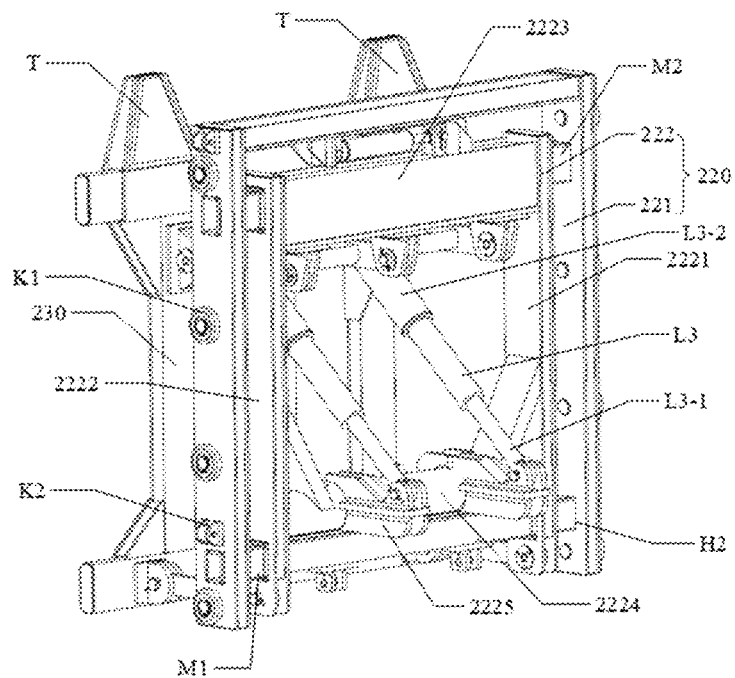
FIG. 4A schematically shows a first three-dimensional structural diagram of a push-lifting frame assembly and a connecting frame of a transport vehicle for a case of a mobile power generation system provided by an embodiment of the present disclosure, in which the connecting frame is in a pushed-out state.
Figure 4B:
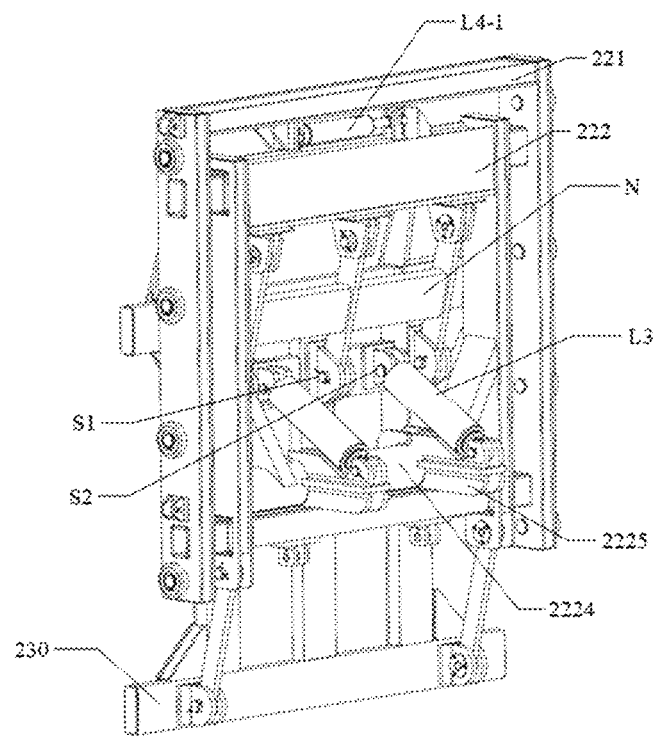
FIG. 4B schematically shows a second three-dimensional structural diagram of a push-lifting frame assembly and a connecting frame of a transport vehicle for a case of a mobile power generation system provided by an embodiment of the present disclosure, in which the connecting frame is in a retracted state.
Figure 4C:
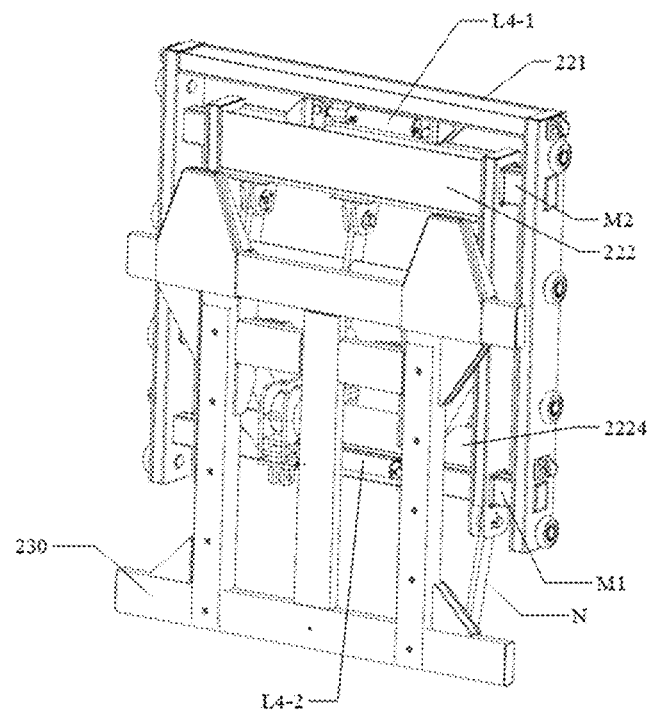
FIG. 4C schematically shows a third three-dimensional structural diagram of a push-lifting frame assembly and a connecting frame of a transport vehicle for a case of a mobile power generation system provided by an embodiment of the present disclosure, in which the connecting frame is in a retracted state.

FIG. 1A schematically shows a structural side view of a transport vehicle for a case of a mobile power generation system provided by an embodiment of the present disclosure, in which a lifting mechanism assembly is in a fully retracted state; FIG. 1B schematically shows a structural side view of a transport vehicle for a case of a mobile power generation system provided by an embodiment of the present disclosure, in which a lifting mechanism assembly is in a first open state where a first included angle is an acute angle; FIG. 2 schematically shows a partial three-dimensional structural diagram of a transport vehicle for a case of a mobile power generation system provided by an embodiment of the present disclosure, in which a lifting mechanism assembly is in a second open state where a first angle is a right angle; FIG. 3 schematically shows a partial structural side view of a lifting mechanism assembly of a transport vehicle for a case of a mobile power generation system provided by an embodiment of the present disclosure; FIG. 4A schematically shows a first three-dimensional structural diagram of a push-lifting frame assembly and a connecting frame of a transport vehicle for a case of a mobile power generation system provided by an embodiment of the present disclosure, in which the connecting frame is in a pushed-out state; FIG. 4B schematically shows a second three-dimensional structural diagram of a push-lifting frame assembly and a connecting frame of a transport vehicle for a case of a mobile power generation system provided by an embodiment of the present disclosure, in which the connecting frame is in a retracted state; FIG. 4C schematically shows a third three-dimensional structural diagram of a push-lifting frame assembly and a connecting frame of a transport vehicle for a case of a mobile power generation system provided by an embodiment of the present disclosure, in which the connecting frame is in a retracted state.

Referring to FIG. 1A to FIG. 4B, the transport vehicle V1 for a case of a mobile power generation system provided by an embodiment of the present disclosure includes: a chassis 100 and a lifting mechanism assembly 200 on the chassis 100. The case may be, for example, an exhaust muffler or an intake ventilation component for a gas turbine generator set.

The chassis 100 includes a main beam 110. For example, the main beam 110 has a strip shape extending in a straight-line traveling direction of the transport vehicle V1.

The main beam 110 includes a first body portion 111 and a second body portion 112.

The lifting mechanism assembly 200 includes a turning frame 210, at least one turning hydraulic cylinder L1, a push-lifting frame assembly 220, at least one elevating hydraulic cylinder L2, a connecting frame 230, and at least one push-lifting hydraulic cylinder L3.

The turning frame 210 is hinged to the chassis 100 at a hinge position MP of the chassis 100. The turning frame 210 includes a positioning end 211 for connecting the chassis 100 and a free end 212 opposite to the positioning end 211.

The at least one turning hydraulic cylinder L1 is connected to the turning frame 210 and the chassis 100 and is configured to drive the turning frame 210 to rotate relative to the chassis 100, so as to change an angle value of a first included angle A1 between a first plane P1 in which a surface of the first body portion 111 facing towards the turning frame 210 is located and a second plane P2 in which a surface of the turning frame 210 facing away from the first body portion 111 is located. In this embodiment, two turning hydraulic cylinders L1 are arranged parallel to each other.

The connecting frame 230 is configured to detachably connect the case. The connecting frame 230 is movably connected to the turning frame 210 in a first direction and a second direction. The first direction is a direction from the positioning end 211 of the turning frame 210 to the free end 212; the second direction is perpendicular to the second plane P2. The first direction intersects the second direction. Herein, the first direction may be parallel to the first plane P1 for example. It can be understood that the first direction may change while the turning frame 210 rotates relative to the chassis 100; the second direction may also change while the turning frame 210 rotates relative to the chassis 100.

The push-lifting frame assembly 220 is movably connected to the turning frame 210.

The at least one elevating hydraulic cylinder L2 is connected to the push-lifting frame assembly 220 and the turning frame 210 and is configured to drive the push-lifting frame assembly 220 to move relative to the turning frame 210 in the first direction. In this embodiment, two elevating hydraulic cylinders L2 are arranged parallel to each other.

Herein, moving in a certain direction includes moving forward in the certain direction and moving backward in the certain direction. Moving in a certain direction does not limit the corresponding movement path in a direction parallel to the certain direction, as long as the corresponding movement path includes a path component in the certain direction, such as the first direction.

The at least one push-lifting hydraulic cylinder L3 is connected to the push-lifting frame assembly 220 and the connecting frame 230 and is configured to drive the connecting frame 230 to move relative to the push-lifting frame assembly 220 in the second direction perpendicular to the second plane P2. In this embodiment, two push-lifting hydraulic cylinders L3 are arranged parallel to each other.

The first body portion 111 is located between the hinge position MP and the second body portion 112. The third plane P3 in which a surface of the second body portion 112 facing towards the turning frame 210 is located is farther away from the connecting frame 230 than the first plane P1. Under a circumstance that the angle value of the first included angle A1 is smallest, a part of the lifting mechanism assembly 200 is located between the first plane P1 and the third plane P3.

For example, referring to FIG. 1A, the circumstance that the angle value of the first included angle A1 between the first plane P1 in which the surface of the first body portion 111 facing towards the turning frame 210 is located and the second plane P2 in which the surface of the turning frame 210 facing away from the first body portion 111 is located is the smallest is the circumstance that the first plane P1 in which the surface of the first body portion 111 facing towards the turning frame 210 is located is parallel to the second plane P2 in which the surface of the turning frame 210 facing away from the first body portion 111.

As shown in FIG. 1A, when the lifting mechanism assembly 200 is in a fully retracted state, the first included angle A1 between the first plane P1 in which the surface of the first body portion 111 facing towards the turning frame 210 and the second planes P2 in which the surface of the turning frame 210 facing away from the first body portion 111 is located has the smallest value, and the connecting frame is closest to the push-lifting frame assembly 220 in the second direction. For example, when the lifting mechanism assembly 200 is in the fully retracted state, a part of each of the turning frame 210, the at least one turning hydraulic cylinder L1, the push-lifting frame assembly 220, the at least one elevating hydraulic cylinder L2, the connecting frame 230, and the at least one push-lifting hydraulic cylinder L3 is located between the first plane P1 and the third plane P3. For example, when the lifting mechanism assembly 200 is in the fully retracted state, the surface of the turning frame 210 facing away from the first body portion 111 is the surface of the lifting mechanism assembly 200 farthest from the first body portion 111 in the second direction. In this circumstance, for example, in the second direction, neither the push-lifting frame assembly 220 nor the connecting frame 230 exceeds the second plane P2 in which the surface of the turning frame 210 facing away from the first body portion 111 is located.

In this way, the transport vehicle integrated with the lifting mechanism assembly provided by the embodiment of the present disclosure can realize the control and adjustment of the position of the case in the first direction and the second direction, without requiring any operator to work at high place and additional hoisting device, thereby simplifying the installation and removing of the case (such as the exhaust muffler case), shortening the installation time of the exhaust muffler, providing convenient installation and low installation cost. In addition, because a part of the lifting mechanism assembly is located between the first plane and the third plane, a sinking space right above the second body portion is effectively used to accommodate the part of the lifting mechanism assembly, thereby avoiding adversely increasing the height of the transport vehicle.

Herein, the first plane P1 in which the surface of the first body portion 111 facing towards the turning frame 210 is located, the second plane P2 in which the surface of the turning frame 210 facing away from the first body portion 111, and the third plane P3 in which the surface of the second body portion 112 facing towards the turning frame 210 is located are all virtual planes.

For example, the surface of the first body portion 111 facing towards the turning frame 210, the surface of the turning frame 210 facing away from the first body portion 111, and the surface of the second body portion 112 facing towards the turning frame 210 are not necessarily strictly flat planes. That is, each of the surface of the first body portion 111 facing towards the turning frame 210, the surface of the turning frame 210 facing away from the first body portion 111, and the surface of the second body portion 112 facing towards the turning frame 210 may have a convex-concave structure of certain degree.

For example, the surface of the second body portion 112 facing towards the turning frame 210 is parallel to the surface of the first body portion 111 facing towards the turning frame 210. Further, the surface of the second body portion 112 facing towards the turning frame 210 and the surface of the first body portion 111 facing towards the turning frame 210 are both parallel to the ground surface.

Still referring to FIGS. 3 to 4B, the push-lifting frame assembly 220 includes: an elevating frame 221 and a sliding frame 222.

The elevating frame 221 is movably connected to the turning frame 210. The push-lifting frame assembly 220 and the turning frame 210 are connected with each other through the elevating frame 221; the at least one elevating hydraulic cylinder L2 is connected to the elevating frame 221 and the turning frame 210 and is configured to drive the elevating frame 221 to move relative to the turning frame 210 in the first direction.

For example, a plurality of roller bearings K1 and an auxiliary bearings K2 are provided on each of two opposite sides of the elevating frame 221 facing towards the turning frame 210. Sliding rails extending in the first direction is provided on side walls of the turning frame 210 facing towards the elevating frame 221. For example, the roller bearing K1 rotates around an axis extending in the third direction; and the auxiliary bearing K2 rotates around an axis extending in the second direction. The elevating frame 221 slides freely on the sliding rails of the turning frame 210 through the roller bearing K1; the auxiliary bearing K2 is configured to prevent the elevating frame 221 from being unbalanced in force when sliding in the slide rails of the turning frame 210 and from being stuck at a specific position of the sliding rail of the turning frame 210.

The sliding frame 222 is movably connected to the elevating frame 221. The push-lifting frame assembly 220 and the connecting frame 230 are connected with each other through a sliding frame 222; the at least one push-lifting hydraulic cylinder L3 is connected to the sliding frame 222 and the connecting frame 230 and is configured to drive the connecting frame 230 to move relative to the sliding frame 222 in the second direction.

The lifting mechanism assembly 200 further includes at least one sliding hydraulic cylinder. At least one sliding hydraulic cylinder L4 is connected to the sliding frame 222 and the elevating frame 221 and is configured to drive the sliding frame 222 to move relative to the elevating frame 221 in the third direction. The third direction is perpendicular to the first direction and intersects the second direction. When the transport vehicle V1 provided by the embodiment of the present disclosure is supported on a horizontal ground surface, the third direction may be a horizontal direction.

In this way, the transport vehicle integrated with the lifting mechanism assembly provided by the embodiment of the present disclosure can realize the control and adjustment of the position of the case in the first direction, the second direction and the third direction. For example, the first direction is an up-down vertical direction, the second direction is a front-back horizontal direction, and the third direction is a left-right horizontal direction. Thus, the exhaust muffler can be installed on the top of the gas turbine generator set case more accurately.

For example, at least one sliding beam is fixedly connected to the elevating frame 221. Referring to FIG. 4A, in this embodiment, two sliding beams M1 and M2 parallel to each other are fixedly connected to the elevating frame 221. The sliding beam M1 and the sliding beam M2 are for example welded to the elevating frame 221. Both the sliding beam M1 and the sliding beam M2 extend in the third direction. The sliding frame 222 is sleeved on the sliding beams M1 and M2 and can move in the third direction relative to the sliding beams M1 and M2.

For example, the sliding frame 222 includes: a first rod 2221 and a second rod 2222 both extending in a first direction, and a third rod 2223 extending in a third direction. The first rod 2221, the second rod 2222, and the third rod 2223 are fixedly connected to one another. That is, the position of any one of the first rod 2221, the second rod 2222, and the third rod 2223 relative to the other two is fixed. For example, the third rod 2223 has a tube shape; each of the first rod 2221 and the second rod 2222 is provided with through holes corresponding to the sliding beam M1 and the sliding beam M2 respectively. In this way, the third rod 2223 is sleeved on the sliding beam M2; upper and lower ends of the first rod 2221 are sleeved on the sliding beam M1 and the sliding beam M2 respectively; upper and lower ends of the second rod 2222 are sleeved on the sliding beam M1 and sliding beam M2 respectively.

For example, the sliding frame 222 is movably connected to the connecting frame 230 through at least one hinged arm N. The at least one hinged arm N is hinged to the connecting frame 230 through a first rotating shaft S1. At least one push-lifting hydraulic cylinder L3 is hinged to the connecting frame 230 through a second rotating shaft S2. Both the first rotating shaft S1 and the second rotating shaft S2 extend in the third direction and are coaxially arranged. Herein, the coaxial arrangement of the first rotating shaft S1 and the second rotating shaft S2 is not limited to the case that the axis of the first rotating shaft S1 and the axis of the second rotating shaft S2 strictly coincide with each other, and a certain deviation is allowed. For example, the first rotation shift S1 and the second rotation shift S2 overlap each other in the third direction. That is, a straight line extending in the third direction passes through the first rotating shaft S1 and the second rotating shaft S2. In this way, the torque provided by the at least one push-lifting hydraulic cylinder L3 can be efficiently transmitted to the at least one hinged arm N, so that the connecting frame 230 can be pushed out more efficiently. It can be understood that, in another embodiment, the first rotating shaft Si and the second rotating shaft S2 may be non-coaxially arranged. For example, the first rotation shift Si and the second rotation shift S2 do not overlap with each in the third direction. That is, the straight line extending in the third direction passes through only one of the first rotation shift S1 and the second rotation shift S2.

For example, the at least one sliding hydraulic cylinder includes a first sliding hydraulic cylinder L4-1 and a second sliding hydraulic cylinder L4-2. In the first direction, the at least one push-lifting hydraulic cylinder L3 is located between the first sliding hydraulic cylinder L4-1 and the second sliding hydraulic cylinder L4-2.

For example, in the first direction, the first sliding hydraulic cylinder L4-1 is located between the sliding frame 222 and the elevating frame 211; in the second direction, the second sliding hydraulic cylinder L4-2 is for example located between the sliding frame 222 and the connecting frame 230.

For example, a mounting support 2225 is fixedly connected to the sliding frame 222. Referring to FIG. 4A, the mounting support 2225 is fixedly connected to the first rod 2221 and the second rod 2222 of the sliding frame 222 through a rod-shaped member 2224 extending in the third direction. In the second direction, a support end of the mounting support 2225 is closer to the second body portion 112 of the chassis than the sliding frame 222. For example, the mounting support 2225 has a cantilever structure.

For example, two opposite ends of the first sliding hydraulic cylinder L4-1 are connected to the third rod 2223 of the sliding frame 222 and the elevating frame 211 respectively; two opposite ends of the second sliding hydraulic cylinder L4-2 are connected to the sliding beam M1 and the rod-shaped member 2224 respectively.

The at least one push-lifting hydraulic cylinder L3 has a third end L3-1 and a fourth end L3-2 opposite to each other. The third end L3-1 and the fourth end L3-2 are movable relative to each other. The third end L3-1 is hinged to the support end of the mounting support 2225 of the push-lifting frame assembly 220, and the fourth end L3-2 is hinged to the connecting frame 230.

The at least one push-lifting hydraulic cylinder L3 is closer to the second body portion 112 of the chassis than the sliding frame 222 in the second direction. In this way, the installation space for the at least one push-lifting hydraulic cylinder L3 can be increased. When the lifting mechanism assembly is in the fully retracted state, the support end of the mounting support 2225 and the end of the at least one push-lifting hydraulic cylinder L3 hinged to the support end are located between the first plane P1 and the third plane P3.

FIG. 5A schematically shows a structural front view of a connecting frame of a transport vehicle for a case of a mobile power generation system provided by an embodiment of the present disclosure; FIG. 5B schematically shows a structural side view of a connecting frame of a transport vehicle for a case of a mobile power generation system provided by an embodiment of the present disclosure.

Referring to FIGS. 1B, 5A and 5B, at least one connecting end T is provided on a side of the connecting frame 230 facing away from the hinge position MP. In this embodiment, the number of the at least one connecting end T is for example two. Each connecting end T has a trapezoidal platform shape. Herein, the trapezoidal platform shape refers to a shape having four side surfaces each of which is in substantially trapezoidal shape. Herein, the substantially trapezoidal shape means that it is not a strict trapezoid, and a certain deformation is allowed. For example, the exhaust muffler case may be provided with a socket having a trapezoidal platform shape corresponding to the at least one connecting end T. In this way, the connection and the detachment between the connecting frame 230 and the exhaust muffler case can be facilitated.

Referring back to FIGS. 1A to 2, a part of the at least one turning hydraulic cylinder L1 is located on a side of the third plane P3 opposite to the first plane P1. In this way, the installation space of the at least one turning hydraulic cylinder L1 is effectively increased and an initial lifting angle can be increased. Thus, a hydraulic cylinder with a larger initial length (minimum length in the compressed state) can be adopted as the turning hydraulic cylinder to provide greater turning propulsion force for the turning frame 210. For example, the turning hydraulic cylinder L1 is a double-acting three-stage cylinder. In this way, the transport vehicle V1 provided by the embodiment of the present disclosure can realize the lifting and installation of the exhaust muffler case in weight of 6 tons.

For example, the chassis 100 further includes a box beam 113 fixedly connected to the second body portion 112 of the main beam 110. The box beam 113 is arranged as intersecting the second body portion 112. The at least one turning hydraulic cylinder L1 and the chassis 100 are connected with each other through a box beam 113. In this way, the strength of the chassis 100 can be increased, so that the exhaust muffler case with heavy weight can be lifted. Specifically, the box beam 113 protrudes from the second body portion 112 on two opposite sides of the second body portion 112. Herein, the cross-sectional shape of the box beam 113 is similar to that of an ordinary box.

For example, the at least one turning hydraulic cylinder L1 has a first end L1-1 and a second end L1-2 opposite to each other. The first end L1-1 and the second end L1-2 are movable relative to each other. The first end L1-1 is hinged to the turning frame 210, and the second end L1-2 is hinged to a side surface of the box beam 113 of the chassis 100 facing towards the first body portion 111.

For example, the transport vehicle V1 provided by the embodiment of the present disclosure further includes a limiting frame 300, and the limiting frame 300 includes a first sub-limiting frame 310 and a second sub-limiting frame 320 hinged to each other. The first sub-limiting frame 310 is hinged to the turning frame 210, and the second sub-limiting frame 320 is hinged to the first body portion 111 of the chassis 100.

The limiting frame 300 can limit the turning angle of the turning frame 210 (i.e., the first included angle A1 between the first plane and the second plane). For example, under the limitation of the limiting frame 300, the maximum turning angle of the turning frame 210 does not exceed 92°.

The limiting frame 300 is welded by using section bars. Compared with the flexible-rope limiting member, the motion track of the limiting frame 300 is controllable, so it can avoid entanglement and interference with the chassis 100; and the limiting frame 300 can further serve as a bracket for other components (for example, hydraulic pipelines or electrical wirings).

For example, under the circumstance that the first included angle is the largest, the second included angle between a surface of the second sub-limiting frame 320 facing towards the first body portion 111 and a surface of the first body portion 111 facing towards the second sub-limiting frame 320 is greater than or equal to 45°. In this way, the limiting effect of the limiting frame 300 on the turning frame 210 can be better guaranteed under the circumstance that the first included angle is the largest.

For example, as shown in FIG. 2, the transport vehicle V1 provided by an embodiment of the present disclosure further includes a hydraulic pipeline D arranged on the limiting frame 300. The hydraulic pipeline D is for example a hydraulic rigid pipe.

The first end L1-1 of the turning hydraulic cylinder L1 is moved along with the turning frame 210 and therefore has a larger movable range, while the second end L1-2 of the turning hydraulic cylinder L1 is hinged to the chassis 100 and therefore has a relatively fixed position. For example, all the openings of the at least one turning hydraulic cylinder L1 for communicating with the liquid outside are only located at the second end L1-2. For example, all the opening(s) of the at least one turning hydraulic cylinder L1 in liquid communicating with outside is/are connected to the hydraulic pipeline D through hydraulic flexible pipes. In this way, it is possible to prevent the hydraulic pipeline connected to the at least one turning hydraulic cylinder L1 from moving along with the turning frame 210, thereby preventing the hydraulic pipeline from adversely interfering with the movement of the lifting mechanism assembly.

The fourth end L3-2 of the push-lifting hydraulic cylinder L3 is moved along with the connecting frame 230 and therefore has a larger range of movement, and the third end L3-1 of the push-lifting hydraulic cylinder L3 is hinged to the push-lifting frame assembly 220 and therefore has a relatively fixed position. For example, all the opening(s) of at least one push-lifting hydraulic cylinder L3 in liquid communicating with outside is/are only located at the third end L3-1. For example, all the opening(s) of at least one push-lifting hydraulic cylinder L3 in liquid communicating with outside is/are connected to the hydraulic pipeline D through hydraulic flexible pipes. In this way, it is possible to prevent the hydraulic pipeline connected to the at least one push-lifting hydraulic cylinder L3 from moving along with the connecting frame 230, thereby preventing the hydraulic pipeline from adversely interfering with the movement of the lifting mechanism assembly.

Still referring to FIGS. 1A and 1B, the transport vehicle V1 for the case of the mobile power generation system provided by the embodiment of the present disclosure further includes: a turning-frame attitude control system 104 arranged on the sliding frame 221; and a hydraulic power unit 101, an electronic control system 102, a hydraulic control system 103, a transport-vehicle attitude control system 105, a laser rangefinder 106, and a hydraulic supporting leg 107, which are arranged on the chassis 100. For example, the exhaust muffler transporter is in the form of a trailer.

The hydraulic system of the transport vehicle V1 for the case of the mobile power generation system provided by the embodiment of the present disclosure is mainly composed of a hydraulic power unit 101 and a hydraulic control system 103. The hydraulic power unit 101 is composed of a hydraulic oil tank, a hydraulic pump, a hydraulic-pump driving motor, a connecting bell-jar for the hydraulic-pump driving motor and the hydraulic pump, a shaft coupler and so on, so as to provide power in need for the lifting mechanisms. The hydraulic control system 103 is composed of a multi-way solenoid control valve, a balance valve, a pressure gauge, and a pressure display. The manual control levers of multi-way solenoid control valve can realize the manual controlling of the turning hydraulic cylinder L1, the elevating hydraulic cylinder L2, the push-lifting hydraulic cylinder L3 and the sliding hydraulic cylinder L4. At the same time, the multi-way solenoid control valve can receive a control signal provided by an electric control system, so that the electric control system can remotely control the turning hydraulic cylinder L1, the elevating hydraulic cylinder L2, the push-lifting hydraulic cylinder L3 and the sliding hydraulic cylinder L4. The balance valve can realize the synchronization of the turning hydraulic cylinder L1, the elevating hydraulic cylinder L2, the push-lifting hydraulic cylinder L3 and the sliding hydraulic cylinder L4, thereby achieving a more stable system control. The pressure gauge and pressure display can display the pressure of the hydraulic system, which is convenient for the operator to make decisions and judge.

The electrical system of the transport vehicle V1 for the case of the mobile power generation system provided by the embodiment of the present disclosure is mainly composed of the electric control system 102, the transport-vehicle attitude control system 105, the laser rangefinder 106, and the turning-frame attitude control system 104. The electronic control system 102 may provide power for the hydraulic driving motor and control the on/off state of the hydraulic driving motor. The electronic control system 102 is equipped with a controller, a wireless remote-control transceiver and a wireless remote controller. The operator may send a control signal to the wireless remote-control transceiver through the wireless remote controller. After receiving the control signal, the wireless remote-control transceiver sends control signal to the multi-way solenoid control valve through the controller for controlling the turning hydraulic cylinder L1, the elevating hydraulic cylinder L2, the push-lifting hydraulic cylinder L3 and the sliding hydraulic cylinder L4, thereby realizing the remote controlling of the lifting mechanism assembly. The transport-vehicle attitude control system 105 and the laser rangefinder 106 may adjust the relative position between an exhaust-muffler transport vehicle and a gas-turbine-generator-set transport vehicle, and simultaneously send attitude information of the exhaust-muffler transport vehicle to the controller; the attitude information is displayed on a control display screen. At the same time, the data information may be remotely transmitted to a display screen of the wireless controller, which is convenient for the operator to make decisions and judge. The turning-frame attitude control system 104 may measure the turning angle of the turning frame and sends the measured data information to the controller; and the controller displays the measured data information on its display screen. At the same time, the data information may be remotely transmitted to the display screen of the wireless controller, which is convenient for the operator to make better operation decisions and judgments.

FIG. 6 schematically shows a flowchart of an installation method for a case of a mobile power generation system according to another embodiment of the present disclosure.

Referring to FIG. 6, the installing method for the case of the mobile power generation system provided by another embodiment of the present disclosure includes:

connecting the case C1 with the connecting frame 230 of the transport vehicle V1 provided in above-mentioned embodiment;

under a circumstance of driving the turning frame 210 to rotate so that the first included angle A1 has a first angle value, driving the connecting frame 230 to move away from the turning frame 210 in the second direction so that the turning frame 210 and the connecting frame 230 are spaced from each other in the second direction, wherein the first angle value is an acute angle value; and under a circumstance of driving the turning frame 210 to rotate so that the first included angle A1 has a second angle value, driving the push-lifting frame assembly 220 to move in the first direction, wherein the second angle value is greater than the first angle value.

Compared with the circumstance that the case is pushed out when the first included angle is zero or 90°, the circumstance that the case is pushed out when the first included angle is an acute angle can firstly reduce the initial force of the turning hydraulic cylinder, and prevent the case C1 on the turning frame from adversely interfering with the case on the gas-turbine-generator-set transport vehicle while the case C1 on the turning frame continues to turn over.

For example, the first angle value is greater than or equal to 20° and less than or equal to 60°. This is more conducive to improving the overall accepted-force state of the turning hydraulic cylinder.

Figure 7A:
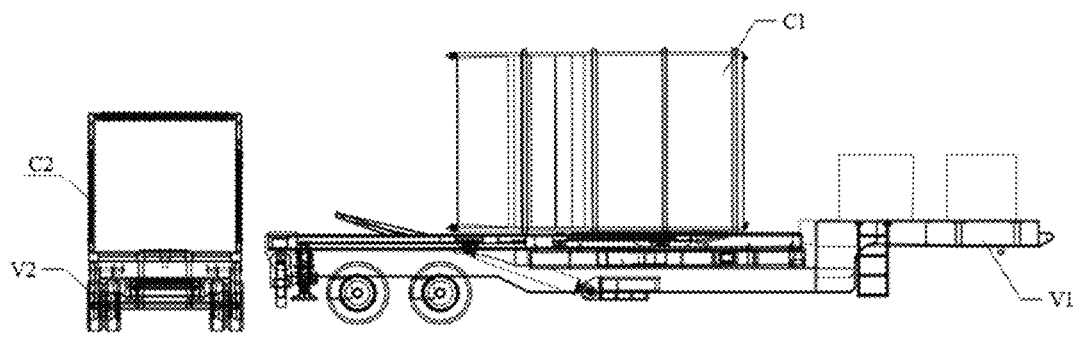
FIG. 7A schematically shows a diagram in which an exhaust muffler case is transported to a vicinity of a gas-turbine-generator-set transport vehicle by using an exhaust-muffler transport vehicle according to an installation method provided by an embodiment of the present disclosure.
Figure 7B:
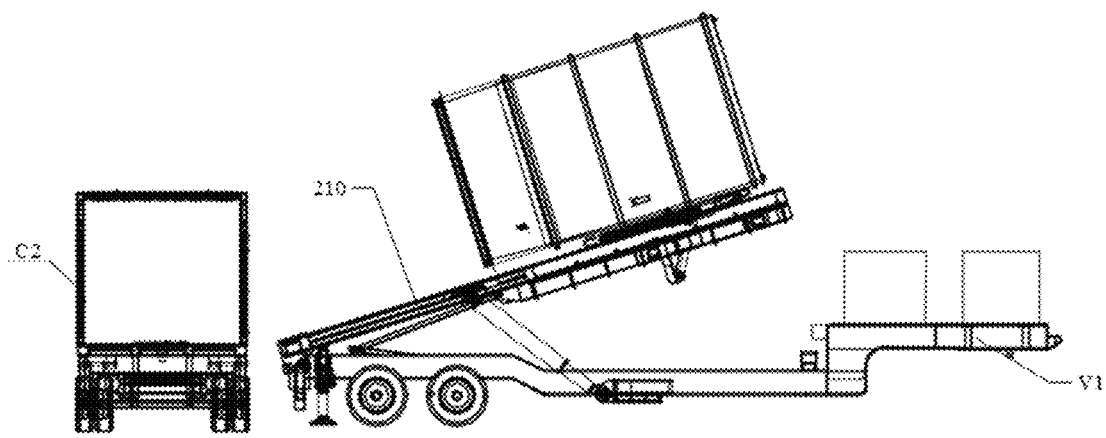
FIG. 7B schematically shows a diagram in which an exhaust muffler case rotates with a turning frame by an acute angle according to an installation method provided by an embodiment of the present disclosure.
Figure 7C:
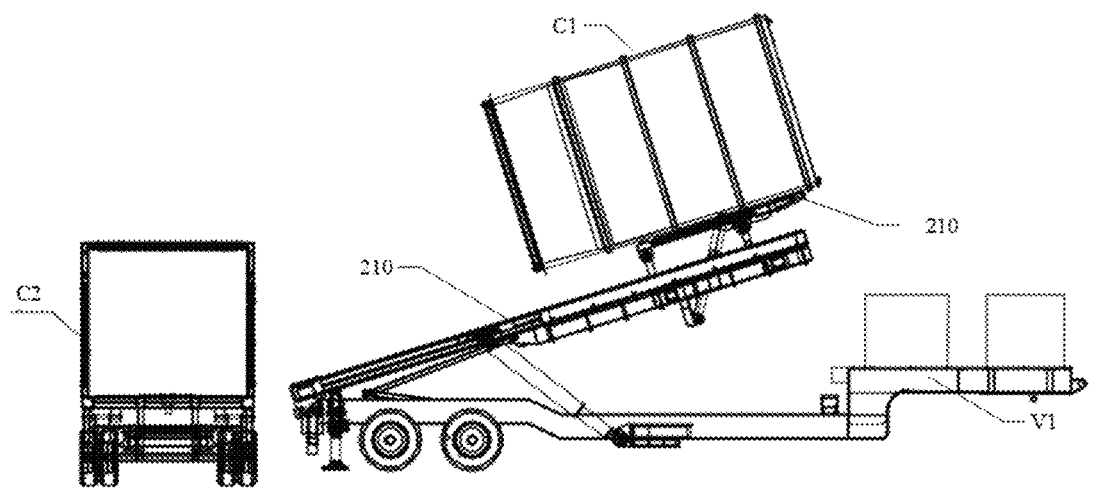
FIG. 7C schematically shows a diagram in which the exhaust muffler case is pushed away from the turning frame from the position shown in FIG. 7B according to an installation method provided by an embodiment of the present disclosure.
Figure 7D:
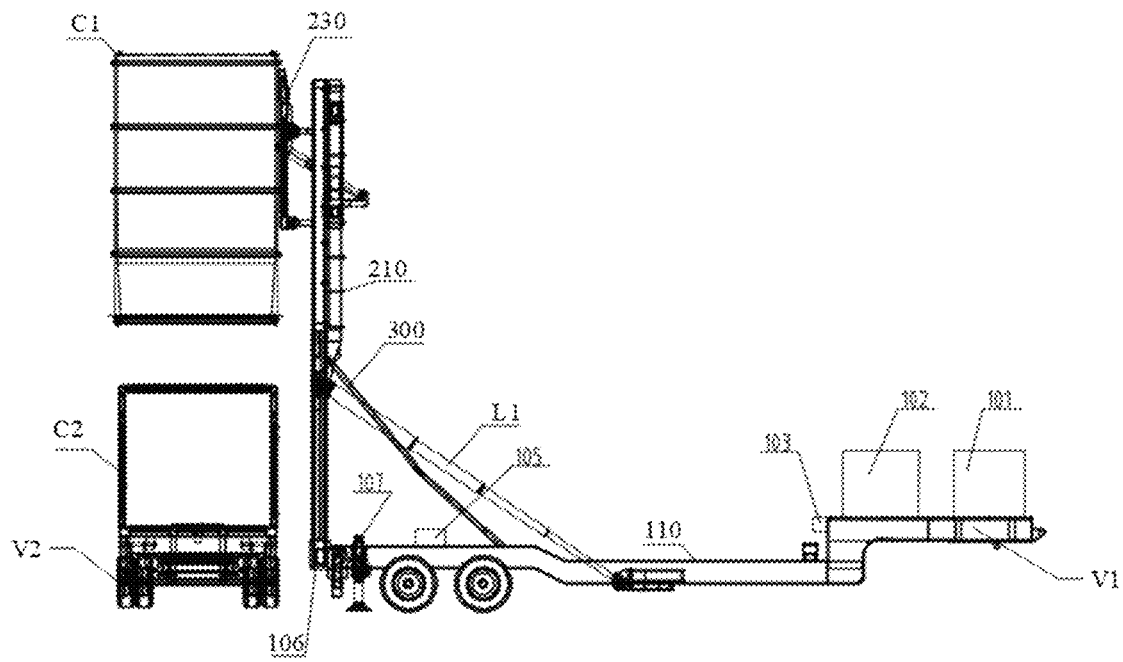
FIG. 7D schematically shows a diagram in which the exhaust muffler case is lifted from the position shown in FIG. 7C to the position directly above a gas turbine generator set case on the gas-turbine-generator-set transport vehicle according to an installation method provided by an embodiment of the present disclosure.
Figure 7E:
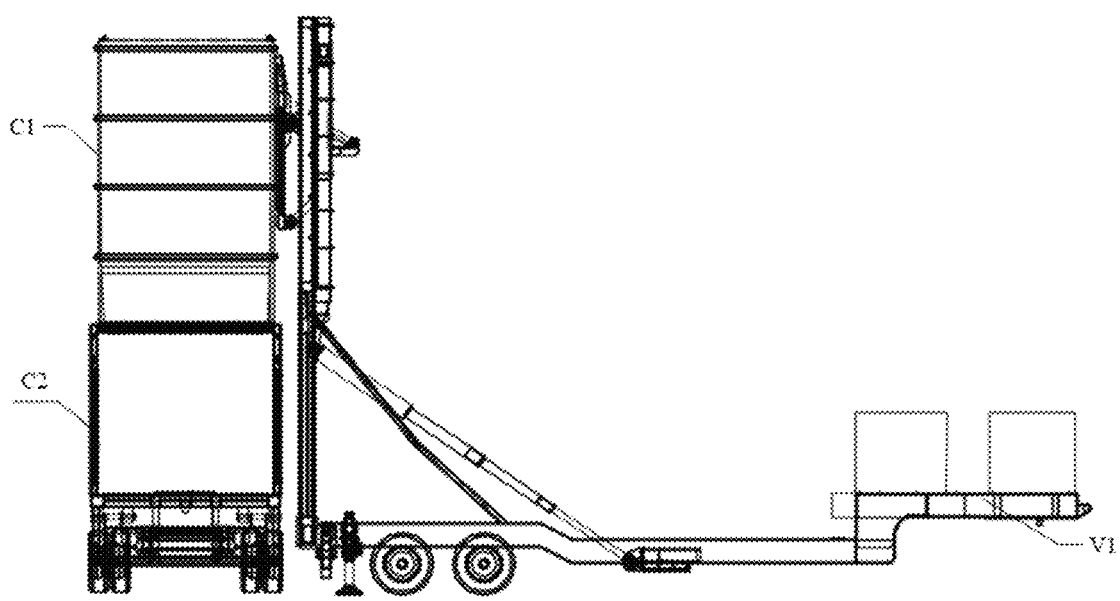
FIG. 7E schematically shows a diagram in which the exhaust muffler case is moved downward from the position shown in FIG. 7D to be coupled to the gas turbine generator set case according to an installation method provided by an embodiment of the present disclosure.

FIG. 7A schematically shows a diagram of an exhaust muffler case which is transported to a vicinity of a gas-turbine-generator-set transport vehicle by using an exhaust-muffler transport vehicle according to an installation method provided by an embodiment of the present disclosure; FIG. 7B schematically shows a diagram of an exhaust muffler case which rotates at an acute angle with a turning frame according to an installation method provided by an embodiment of the present disclosure; FIG. 7C schematically shows a diagram of the exhaust muffler case which is pushed away from the turning frame from the position of FIG. 7B according to an installation method provided by an embodiment of the present disclosure; FIG. 7D schematically shows a diagram of the exhaust muffler case which is lifted from the position of FIG. 7C to the position directly above the gas turbine generator set case on the gas-turbine-generator-set transport vehicle according to an installation method provided by an embodiment of the present disclosure; and FIG. 7E schematically shows a diagram of the exhaust muffler case which is moved downward from the position of FIG. 7D to be coupled to the gas turbine generator set case according to an installation method provided by an embodiment of the present disclosure.

Hereinafter, referring to FIGS. 7A to 7E, the installing method for the case of the mobile power generation system according to another embodiment of the present disclosure will be specifically described.

As shown in FIG. 7A, the exhaust-muffler transport vehicle V1 transports the exhaust muffler case C1 with an exhaust muffler inside to a designated location. In the transportation state shown in FIG. 7A, the connecting frame 230 of the exhaust-muffler transport vehicle V1 is connected to the exhaust muffler case C1. For example, the laser distance meter 106 measures the distance between the exhaust-muffler transport vehicle V1 and the gas-turbine-generator-set transport vehicle V2; and the distance is adjusted to a suitable range. Then, the exhaust-muffler transport vehicle V1 is supported by the hydraulic supporting legs 107 and adjusted to the horizontal state through the transport-vehicle attitude control system 105, such that the adjustment of the relative position between the exhaust-muffler transport vehicle V1 and the gas-turbine-generator-set transport vehicle V2 is completed.

As shown in FIG. 7B, the turning frame 210 is driven to rotate to the first angle value by the turning hydraulic cylinder L1. That is, the turning frame 210 is driven to rotate by the turning hydraulic cylinder L1 so that the first included angle A1 has the first angle value. For example, the first angle value is 30°.

As shown in FIG. 7C, under the circumstance that the first included angle A1 has the first angle value, the exhaust muffler case C1 connected to the connecting frame 230 is pushed away from the turning frame 210 by the push-lifting hydraulic cylinder L3.

As shown in FIG. 7D, the turning frame 210 is continuously driven to rotate to the second angle value by the turning hydraulic cylinder L1. That is, the turning frame 210 is driven to rotate by the turning hydraulic cylinder L1 so that the first included angle A1 has the second angle value. For example, the second angle value is 90°. The limiting frame 300 and the turning-frame attitude control system 104 can limit the turning degree of the turning frame 210 and prevent the turning degree from being excessive and out of balance.

As shown in FIG. 7D, the position of the exhaust muffler case C1 in a length direction of the gas-turbine-generator-set transport vehicle V2 may be adjusted by the sliding hydraulic cylinder L4; the position of the exhaust muffler case C1 in a width direction of the gas-turbine-generator-set transport vehicle V2 may be adjusted by the push-lifting hydraulic cylinder L3; the position of the exhaust muffler case C1 in a height direction (i.e., the vertical direction) of the gas-turbine-generator-set transport vehicle V2 may be adjusted by the elevating hydraulic cylinder L2.

Referring to FIG. 7E, after the adjustment of the position of the exhaust muffler case C1 is completed, the exhaust muffler case C1 is dropped onto the top of the gas turbine generator set case C2 with the gas turbine generator set inside, of the gas-turbine-generator-set transport vehicle V2 through the elevating hydraulic cylinder L2. For example, the exhaust muffler case C1 is fixed by an automatic locking mechanism of the gas-turbine-generator-set transport vehicle V2, and the installation of the exhaust muffler case C1 is completed.

Then, the elevating hydraulic cylinder L2 continues to move down and the connecting frame 230 is separated from the exhaust muffler case C1. Next, the turning frame 210 is driven to rotate to an acute angle (that is, the first included angle has the acute angle value) through the turning hydraulic cylinder L1, and in this state, the connecting frame is retracted by the pushing hydraulic cylinder. Then, the turning frame 210 is continuously driven to rotate by the turning hydraulic cylinder L1 so as to be in the transportation state. For example, in the transportation state, the lifting mechanism assembly is in a fully retracted state, and the angle value of the first included angle is for example zero. In this way, the exhaust-muffler transport vehicle V1 can drive away from the gas-turbine-generator-set transport vehicle V2, thereby reducing site space occupation.

Herein, some points needs to be explained:

(1) Drawings of the embodiments of the present disclosure only refer to structures related with the embodiments of the present disclosure, and other structures may refer to general design.

(2) For clarity, in the drawings used to describe embodiments of the present disclosure, the thickness of layers or regions is enlarged or reduced, i.e., these drawings are not drawn to actual scale.

(3) In case of no conflict, features in the embodiments and the embodiments of the present disclosure may be combined with each other to obtain new embodiment(s).

The foregoing embodiments merely are exemplary embodiments of the present disclosure, and not intended to limit the scope of the present disclosure, and the scope of the present disclosure is determined by the appended claims.

The invention claimed is:

1. A transport vehicle for a case of a mobile power generation system, comprising:
   a chassis comprising a main beam, wherein the main beam comprises a first body portion; and
   a lifting mechanism assembly, located on the chassis and comprising:
      a turning frame, hinged to the chassis at a hinged position of the chassis, wherein the turning frame comprises a positioning end configured to be connected to the chassis and a free end opposite to the positioning end;
      at least one turning hydraulic cylinder, connected to the turning frame and the chassis, and configured to drive the turning frame to rotate relative to the chassis to change an angle value of a first included angle between a first plane in which a surface of the first body portion facing towards the turning frame is located and a second plane in which a surface of the turning frame facing away from the first body portion is located; and
      a connecting frame, configured to be detachably connected to the case, wherein the connecting frame is movably connected to the turning frame in a first direction and a second direction, and the first direction is a direction from the positioning end to the free end, the second direction is perpendicular to the second plane, and the first direction intersects the second direction,
   wherein the main beam further comprises a second body portion, the first body portion is located between the hinged position and the second body portion, and a third plane in which a surface of the second body portion facing towards the turning frame is located is farther away from the connecting frame than the first plane; and wherein under a circumstance that the angle value of the first included angle is smallest, a part of the lifting mechanism assembly is located between the first plane and the third plane.

2. The transport vehicle according to claim 1, wherein the lifting mechanism assembly further comprises:
   a push-lifting frame assembly, movably connected to the turning frame;
   at least one elevating hydraulic cylinder, connected to the push-lifting frame assembly and the turning frame and configured to drive the push-lifting frame assembly to move relative to the turning frame in the first direction; and
   at least one push-lifting hydraulic cylinder, connected to the push-lifting frame assembly and the connecting frame and configured to drive the connecting frame to move relative to the push-lifting frame assembly in the second direction.

3. The transport vehicle according to claim 2, wherein the push-lifting frame assembly comprises:
- an elevating frame, movably connected to the turning frame, wherein the push-lifting frame assembly and the turning frame are connected with each other through the elevating frame, the at least one elevating hydraulic cylinder is connected to the elevating frame and the turning frame and is configured to drive the elevating frame to move relative to the turning frame in the first direction; and
- a sliding frame, movably connected to the elevating frame, wherein the push-lifting frame assembly and the connecting frame are connected with each other through the sliding frame, and the at least one push-lifting hydraulic cylinder is connected to the sliding frame and the connecting frame and is configured to drive the connecting frame to move relative to the sliding frame in the second direction,
- wherein the lifting mechanism assembly further comprises: at least one sliding hydraulic cylinder connected to the sliding frame and the elevating frame and configured to drive the sliding frame to move relative to the elevating frame in a third direction, wherein the third direction is perpendicular to the first direction and the second direction.

4. The transport vehicle according to claim 3, wherein at least one sliding beam is fixedly connected to the elevating frame, the at least one sliding beam extends in the third direction, and the sliding frame is sleeved on the at least one sliding beam and is configured to move relative to the at least one sliding beam in the third direction.

5. The transport vehicle according to claim 4, wherein the sliding frame is movably connected to the connecting frame through at least one hinged arm, and the at least one hinged arm is hinged to the connecting frame through a first rotating shaft, the at least one push- lifting hydraulic cylinder is hinged with the connecting frame through a second rotating shaft, and the first rotating shaft and the second rotating shaft both extend in the third direction and are arranged coaxially.

6. The transport vehicle according to claim 3, wherein the at least one sliding hydraulic cylinder comprises a first sliding hydraulic cylinder and a second sliding hydraulic cylinder,
- the at least one push-lifting hydraulic cylinder is located between the first sliding hydraulic cylinder and the second sliding hydraulic cylinder in the first direction.

7. The transport vehicle according to claim 6, wherein:
- the first sliding hydraulic cylinder is located between the sliding frame and the elevating frame in the first direction;
- the second sliding hydraulic cylinder is located between the sliding frame and the connecting frame in the second direction.

8. The transport vehicle according to claim 3, wherein a mounting support is fixedly connected to the sliding frame, a support end of the mounting support is closer to the second body portion of the chassis in the second direction than the sliding frame, the at least one push-lifting hydraulic cylinder is hinged to the support end and is closer to the second body portion of the chassis in the second direction than the sliding frame.

9. The transport vehicle according to claim 2, wherein the at least one push-lifting hydraulic cylinder has a third end and a fourth end opposite to the third end, the third end and the fourth end are movable relative to each other, the third end is hinged to the push-lifting frame assembly, the fourth end is hinged to the connecting frame, and the at least one push lifting hydraulic cylinder has at least one opening in liquid communication with the outside of the cylinder, and each of the at least one opening is located at the third end.

10. The transport vehicle according to claim 2, wherein a part of the at least one turning hydraulic cylinder is located on a side of the third plane opposite to the first plane.

11. The transport vehicle according to claim 1, wherein a part of the at least one turning hydraulic cylinder is located on a side of the third plane opposite to the first plane.

12. The transport vehicle according to claim 11, wherein the chassis further comprises a box beam fixedly connected to the second body portion of the main beam, the box beam is arranged as intersecting the second body portion of the main beam, and the at least one turning hydraulic cylinder and the chassis are connected with each other through the box beam.

13. The transport vehicle according to claim 1, further comprising: a limiting frame, wherein the limiting frame comprises a first sub-limiting frame and a second sub-limiting frame hinged to each other, the first sub-limiting frame is hinged onto the turning frame, the second sub-limiting frame is hinged onto the first body portion of the chassis.

14. The transport vehicle according to claim 13, wherein under a circumstance that the first included angle is largest, a second included angle between a surface of the second sub-limiting frame facing towards the first body portion and a surface of the first body portion facing towards the second sub-limiting frame is greater than or equal to 45°.

15. The transport vehicle according to claim 13, further comprising: a hydraulic pipeline arranged on the limiting frame.

16. The transport vehicle according to claim 1, wherein the at least one turning hydraulic cylinder has a first end and a second end opposite to the first end, the first end and the second end are movable relative to each other, the first end is hinged to the turning frame, the second end is hinged to the chassis, and the at least one turning hydraulic cylinder has at least one opening in liquid communication with the outside of the cylinder, and each of the at least one opening is located at the second end.

17. The transport vehicle according to claim 1, wherein at least one connecting end is provided on a side of the connecting frame facing away from the hinge position, the at least one connecting end has a trapezoidal platform shape.

18. The transport vehicle according to claim 1, wherein the case is an exhaust muffler for a gas turbine generator set.

19. An installation method for a case of a mobile power generation system, comprising:
- connecting the case with the connecting frame of the transport vehicle according to claim 2;
- under a circumstance of driving the turning frame to rotate so that the first included angle has a first angle value, driving the connecting frame to move away from the turning frame in the second direction so that the turning frame and the connecting frame are spaced from each other in the second direction, wherein the first angle value is an acute angle value;
- under a circumstance of driving the turning frame to rotate so that the first included angle has a second angle value, driving the push-lifting frame assembly to move in the first direction, wherein the second angle value is greater than the first angle value.

20. The installation method according to claim 19, wherein the first angle value is greater than or equal to 20° and less than or equal to 60°.

* * * * *